United States Patent
Hoxha et al.

(10) Patent No.: US 12,358,532 B2
(45) Date of Patent: Jul. 15, 2025

(54) SYSTEMS AND METHODS FOR ONLINE MONITORING USING A NEURAL MODEL BY AN AUTOMATED VEHICLE

(71) Applicant: Toyota Motor Engineering & Manufacturing North America, Inc., Plano, TX (US)

(72) Inventors: Bardh Hoxha, Canton, MI (US); Tomoya Yamaguchi, Ann Arbor, MI (US); Abdelrahman Hekal, Newcastle upon Tyne (GB); Sergiy Bogomolov, Newcastle upon Tyne (GB)

(73) Assignees: Toyota Motor Engineering & Manufacturing North America, Inc., Plano, TX (US); Toyota Jidosha Kabushiki Kaisha, Toyota (JP); University of Newcastle Upon Tyne, Newcastle upon Tyne (GB)

(*) Notice: Subject to any disclaimer, the term of this patent is extended or adjusted under 35 U.S.C. 154(b) by 376 days.

(21) Appl. No.: 17/945,253

(22) Filed: Sep. 15, 2022

(65) Prior Publication Data
US 2024/0101153 A1    Mar. 28, 2024

(51) Int. Cl.
*B60W 60/00*    (2020.01)
*B60W 30/095*    (2012.01)
(Continued)

(52) U.S. Cl.
CPC .... *B60W 60/0015* (2020.02); *B60W 50/0097* (2013.01); *B60W 50/0098* (2013.01);
(Continued)

(58) Field of Classification Search
CPC ......... B60W 60/0015; B60W 50/0097; B60W 50/0098; B60W 30/18163;
(Continued)

(56) References Cited

U.S. PATENT DOCUMENTS

2022/0048513 A1* 2/2022 Xu .................. B60W 30/18163
2023/0069215 A1* 3/2023 Chong ................... G06V 20/58

FOREIGN PATENT DOCUMENTS

CN    109849900 A  *  6/2019
JP    2007223494 A     9/2007

OTHER PUBLICATIONS

Dou et al, "Strategic car-following gap model considering the effect of cut-ins from adjacent lanes," IET intelligent transport systems, Dec. 2016, vol. 10 (10), p. 658-665, Article 658 (Year: 2016).*

(Continued)

*Primary Examiner* — Kito R Robinson
*Assistant Examiner* — Zachary E. F. Glade
(74) *Attorney, Agent, or Firm* — Christopher G. Darrow; Darrow Mustafa PC

(57) ABSTRACT

Systems, methods, and other embodiments described herein relate to estimating reachable states for a vehicle using a neural model. In one embodiment, a method includes generating an unverified command by a first controller and a safety command by a second controller for a projected path by an automated driving system (ADS) associated with a vehicle. The method also includes estimating reachable states by a neural network (NN) model that uses the unverified command and an initial condition for the vehicle, the reachable states representing positions and orientations for the vehicle within a bounded time and a state space associated with the initial condition and the projected path. The method also includes, upon determining that the reachable states satisfy collision criteria, executing by the vehicle a maneuver with the safety command for the projected path and generating subsequent commands using vehicle data from the first controller and the second controller.

20 Claims, 5 Drawing Sheets

(51) Int. Cl.
*B60W 30/18* (2012.01)
*B60W 50/00* (2006.01)
*G06N 3/08* (2023.01)

(52) U.S. Cl.
CPC ........... *G06N 3/08* (2013.01); *B60W 30/0953* (2013.01); *B60W 30/18163* (2013.01); *B60W 2510/20* (2013.01); *B60W 2520/10* (2013.01); *B60W 2552/05* (2020.02); *B60W 2554/802* (2020.02)

(58) Field of Classification Search
CPC ......... B60W 2510/20; B60W 2520/10; B60W 2552/05; B60W 2554/802; B60W 30/16; B60W 30/18159; B60W 2050/0006; B60W 30/09; B60W 30/0953; G06N 3/08; G06N 3/045
See application file for complete search history.

(56) References Cited

OTHER PUBLICATIONS

Dutta, "Verification of Neural Networks," University of Colorado, 2020 (Year: 2020).*
Althoff et al, "Online Verification of Automated Road Vehicles Using Reachability Analysis," IEEE transactions on robotics, 2014, vol. 30, p. 903-918 (Year: 2014).*
Bortolussi et al, "Neural predictive monitoring and a comparison of frequentist and Bayesian approaches," International Journal on Software Tools for Technology Transfer, 2021 (Year: 2021).*
Musau et al, "An Empirical Analysis of the Use of Real-Time Reachability for the Safety Assurance of Autonomous Vehicles," arXiv.org, 2022 (Year: 2022).*
Vitelli et al., "SafetyNet: Safe planning for real-world self-driving vehicles using machine-learned policies," 2022 International Conference on Robotics and Automation (ICRA), 2022, p. 897-904 (Year: 2022).*
Seto et al., âThe Simplex Architecture for Safe On-Line Control System Upgrades,â Proceedings of the 1998 American Control Conference ACC (IEEE Cat. No. 98CH36207), vol. 6 IEEE, 1998, p. 3504-3508 (Year: 1998).*
Machine Translation of CN 109849900 A (Year: 2019).*
Chen et al., "Decomposed reachability analysis for nonlinear systems," 2016 IEEE Real-Time Systems Symposium (RTSS), pp. 13-24.
Althoff et al., "Online verification of automated road vehicles using reachability analysis," IEEE Transactions on Robotics, vol. 30, No. 4, 2014, pp. 903-918.
Owen et al., "Acas xu: Integrated collision avoidance and detect and avoid capability for uas," in 2019 IEEE/AIAA 38th Digital Avionics Systems Conference (DASC), pp. 1-10.
Djeridane et al., "Neural approximation of pde solutions: An application to reachability computations," in Proceedings of the 45th IEEE Conference on Decision and Control, IEEE, 2006, pp. 3034-3039.
Meng et al., "Learning density distribution of reachable states for autonomous systems," in Conference on Robot Learning, PLMR, 2022, pp. 124-136.
Musau et al., "An Empirical Analysis of the Use of Real-Time Reachability for the Safety Assurance of Autonomous Vehicles," arXiv:2205.01419, May 3, 2022, pp. 1-30.
Bortolussi et al., "Neural predictive monitoring and a comparison of frequentist and Bayesian approaches," International Journal on Software Tools for Technology Transfer, vol. 23, 2021, pp. 615-640.
Chou et al., "Predictive Runtime Monitoring of Vehicle Models Using Bayesian Estimation and Reachability Analysis," 2020 IEEE/RSJ International Conference on Intelligent Robots and Systems (IROS), pp. 2111-2118.

Phan et al., "Neural State Classification for Hybrid Systems," Automated Technology for Verification and Analysis, vol. 11138, 2018, pp. 422-440.
Chen et al., "Safe Autonomous Racing via Approximate Reachability on Ego-vision," arXiv:2110.07699v2, Nov. 30, 2021, pp. 1-17.
Bak et al., "Real-Time Reachability for Verified Simplex Design," 2014 IEEE Real-Time Systems Symposium, pp. 138-148.
Jain et al., "Autonomy 2.0: Why is self-driving always 5 years away?" arXiv:2107.08142, 2021, pp. 1-10.
G. Frehse, "PHAVer: Algorithmic Verification of Hybrid Systems Past HyTech," in Hybrid Systems: Computation and Control, ser. LNCS, vol. 3414, Springer, 2005, pp. 258-273.
Tran et al., "Nnv: the neural network verification tool for deep neural networks and learning-enabled cyber-physical systems," in International Conference on Computer Aided Verification. Springer, 2020, pp. 3-17.
Ivanov et al., "Verisig: verifying safety properties of hybrid systems with neural network controllers," in Proceedings of the 22nd ACM International Conference on Hybrid Systems: Computation and Control, 2019, pp. 169-178.
Sha et al., "Using simplicity to control complexity," IEEE Software, vol. 18, No. 4, 2001, pp. 20-28.
Vitelli et al., "Safetynet: Safe planning for real-world self-driving vehicles using machine-learned policies," arXiv:2109.13602, 2021, pp. 1-7.
M. Mitchell, "Comparing forward and backward reachability as tools for safety analysis," in Hybrid Systems: Computation and Control, A. Bemporad, A. Bicchi, and G. Buttazzo, Eds. Berlin, Heidelberg: Springer Berlin Heidelberg, 2007, pp. 428-443.
Frehse et al., "SpaceEx: Scalable Verification of Hybrid Systems," in Proceedings of the 23d CAV, 2011, pp. 379-395.
Asarin et al., "Approximate reachability analysis of piecewise-linear dynamical systems," in International workshop on hybrid systems: Computation and control. Springer, 2000, pp. 20-31.
Bemporad et al., "Verification of hybrid systems via mathematical programming," in Hybrid Systems: Computation and Control, F. W. Vaandrager and J. H. van Schuppen, Eds. Berlin, Heidelberg: Springer Berlin Heidelberg, 1999, pp. 31-45.
Tomlin et al., "Computational techniques for the verification of hybrid systems," Proceedings of the IEEE, vol. 91, No. 7, 2003, pp. 986-1001.
Chen et al., "Flow*: An Analyzer for Non-Linear Hybrid Systems," in Computer-Aided Verification (CAV), ser. LNCS, vol. 8044. Springer-Verlag, 2013, pp. 258-263.
Prandini et al., "Randomized algorithms for probabilistic aircraft conflict detection," in Proceedings of the 38th IEEE Conference on Decision and Control (Cat. No. 99CH36304), vol. 3. IEEE, 1999, pp. 2444-2449.
Lygeros et al., "Aircraft and weather models for probabilistic collision avoidance in air traffic control," in Proceedings of the 41st IEEE Conference on Decision and Control, 2002., vol. 3. IEEE, 2002, pp. 2427-2432.
Rubies-Royo et al., "A classification-based approach for approximate reachability," in 2019 International Conference on Robotics and Automation (ICRA). IEEE, 2019, pp. 7697-7704.
Paszke et al., "Pytorch: An imperative style, high-performance deep learning library," Advances in neural information processing systems, vol. 32, 2019, pp. 8026-8037.
Legay et al., "Statistical model checking: An overview," in International conference on runtime verification. Springer, 2010, pp. 122-135.
Obayashi et al., "Appropriate overtaking motion generating method using predictive control with suitable car dynamics," in 2016 IEEE 55th Conference on Decision and Control (CDC). IEEE, 2016, pp. 4992-4997.
Seto et al., "The simplex architecture for safe online control system upgrades," in Proceedings of the 1998 American Control Conference. ACC (IEEE Cat. No. 98CH36207), vol. 6. IEEE, 1998, pp. 3504-3508.
Wang et al., Model predictive control system design and implementationusing MATLAB®, Springer Science & Business Media, 2009, 403 pages.

(56) References Cited

OTHER PUBLICATIONS

Sakai et al., "Pythonrobotics: a python code collection of robotics algorithms," arXiv:1808.10703, 2018, pp. 1-8.
O'Kelly et al., "F1TENTH: An open-source evaluation environment for continuous control and reinforcement learning," in NeurIPS 2019 Competition and Demonstration Track, PMLR, 2020, pp. 77-89.
Brockman et al., "Openai gym," arXiv:1606.01540, Jun. 5, 2016, pp. 1-4.
Seshia et al., "Formal specification for deep neural networks," in International Symposium on Automated Technology for Verification and Analysis, Springer, 2018, pp. 20-34.
A. Reschka, "Safety concept for autonomous vehicles," in Autonomous Driving, Springer, 2016, pp. 473-496.
Sezer et al., "A novel obstacle avoidance algorithm: Follow the gap method," Robotics and Autonomous Systems, vol. 60, No. 9, 2012, pp. 1123-1134.

* cited by examiner

SYSTEMS AND METHODS FOR ONLINE MONITORING USING A NEURAL MODEL BY AN AUTOMATED VEHICLE

TECHNICAL FIELD

The subject matter described herein relates, in general, to selecting driving commands, and, more particularly, to selecting the driving commands by estimating reachable states for a vehicle using a neural model that efficiently processes various commands.

BACKGROUND

Automated vehicles utilize various approaches to safely navigate roads. For example, automated driving systems (ADS) use perception systems that acquire sensor data to perceive road hazards. In one approach, an ADS operates with a predictive controller that generates driving commands (e.g., steering, acceleration, etc.) to reliably navigate a road. Still, these systems may encounter unsafe and complex scenarios that do not meet safety demands. For example, a system generates an erroneous driving command when automatically changing lanes because of an animal crossing the road. Accordingly, a vehicle using the ADS with the predictive controller can result in collisions that reduce operator confidence in automated driving.

A system can utilize a safety controller to generate commands for a maneuver outputted by the ADS. For example, the system maintains safety through advanced control and switches to the safety controller for unsafe states on the road. However, such systems can miss unsafe states or excessively switch to safe commands causing operator discomfort. These systems may also still encounter collisions due to insufficient reaction times, thereby putting vehicles at risk.

SUMMARY

In one embodiment, example systems and methods relate to a manner of estimating reachable states for a vehicle using a neural model. In various implementations, systems using an automated driving system (ADS) and a predictive controller to navigate encounter difficulties from atypical driving scenarios. For example, a system generates an unsafe driving command when automatically changing lanes on a complex road where an animal is crossing. Here, the system may be unable to automatically generate a driving command and avoid a collision with the animal due to the road complexity or conditions (e.g., dim lighting). Therefore, in one embodiment, a prediction system uses a neural network (NN) model that efficiently estimates reachable states to select driving commands for a projected path during automated driving. Here, a reachable state can be a position and an orientation of a vehicle within a bounded time associated with a path outputted by an ADS that the vehicle can safely handle during the automated driving. In one approach, the prediction system uses a model predictive controller (MPC) that generates a complex driving command (e.g., diagonal movement) and an additional controller that generates a safe driving command (e.g., speed maintenance) during the automated driving. The NN model estimates the reachable states using the complex driving command and an initial condition for the vehicle to assess safe handling on the projected path. However, the vehicle executes a maneuver with the safe driving command for the projected path when the reachable states satisfy collision criteria (e.g., insufficient vehicle separation). In this way, the prediction system can rapidly switch between different driving commands while safely and smoothly maneuvering the projected path from the ADS.

As a further aspect, in various implementations, the prediction system trains the NN model using simulated data for the vehicle and a template polyhedra. Here, the template polyhedra (e.g., octagonal) efficiently define coefficients for the NN model according to a set of predefined directions for the vehicle. As such, the training involves using multiple versions of the NN model according to the number of coefficients and the set. In one approach, the prediction system iteratively uses parallel computations for the coefficients associated with various predefined directions and periods for a time interval. Furthermore, the training may apply a loss function that reduces the NN model from erroneously estimating reachable states that are unsafe as safe. At the same time, the training increases estimates by the NN model of the reachable states that are safe and conservative. Accordingly, the prediction system trains the NN model to estimate reachable states for the vehicle efficiently and select vehicle commands that maintain safety and comfort during implementation.

In one embodiment, a prediction system that estimates reachable states of a vehicle using a neural model is disclosed. The prediction system includes a processor and a memory storing instructions that, when executed by the processor, cause the processor to generate an unverified command by a first controller and a safety command by a second controller for a projected path by an ADS associated with a vehicle. The instructions also include instructions to estimate reachable states by a NN model that uses the unverified command and an initial condition for the vehicle, the reachable states representing positions and orientations for the vehicle within a bounded time and a state space associated with the initial condition and the projected path. The instructions also include instructions, upon determining that the reachable states satisfy collision criteria, to execute by the vehicle a maneuver with the safety command for the projected path and generating subsequent commands using vehicle data from the first controller and the second controller.

In one embodiment, a non-transitory computer-readable medium for estimating reachable states of a vehicle using a neural model and including instructions that when executed by a processor cause the processor to perform one or more functions is disclosed. The instructions include instructions to generate an unverified command by a first controller and a safety command by a second controller for a projected path by an ADS associated with a vehicle. The instructions also include instructions to estimate reachable states by a NN model that uses the unverified command and an initial condition for the vehicle, the reachable states representing positions and orientations for the vehicle within a bounded time and a state space associated with the initial condition and the projected path. The instructions also include instructions, upon determining that the reachable states satisfy collision criteria, to execute by the vehicle a maneuver with the safety command for the projected path and generating subsequent commands using vehicle data from the first controller and the second controller.

In one embodiment, a method for estimating reachable states of a vehicle using a neural model is disclosed. In one embodiment, the method includes generating an unverified command by a first controller and a safety command by a second controller for a projected path by an ADS associated with a vehicle. The method also includes estimating reachable states by a NN model that uses the unverified command and an initial condition for the vehicle, the reachable states representing positions and orientations for the vehicle within a bounded time and a state space associated with the initial condition and the projected path. The method also includes, upon determining that the reachable states satisfy collision criteria, executing by the vehicle a maneuver with the safety command for the projected path and generating subsequent commands using vehicle data from the first controller and the second controller.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
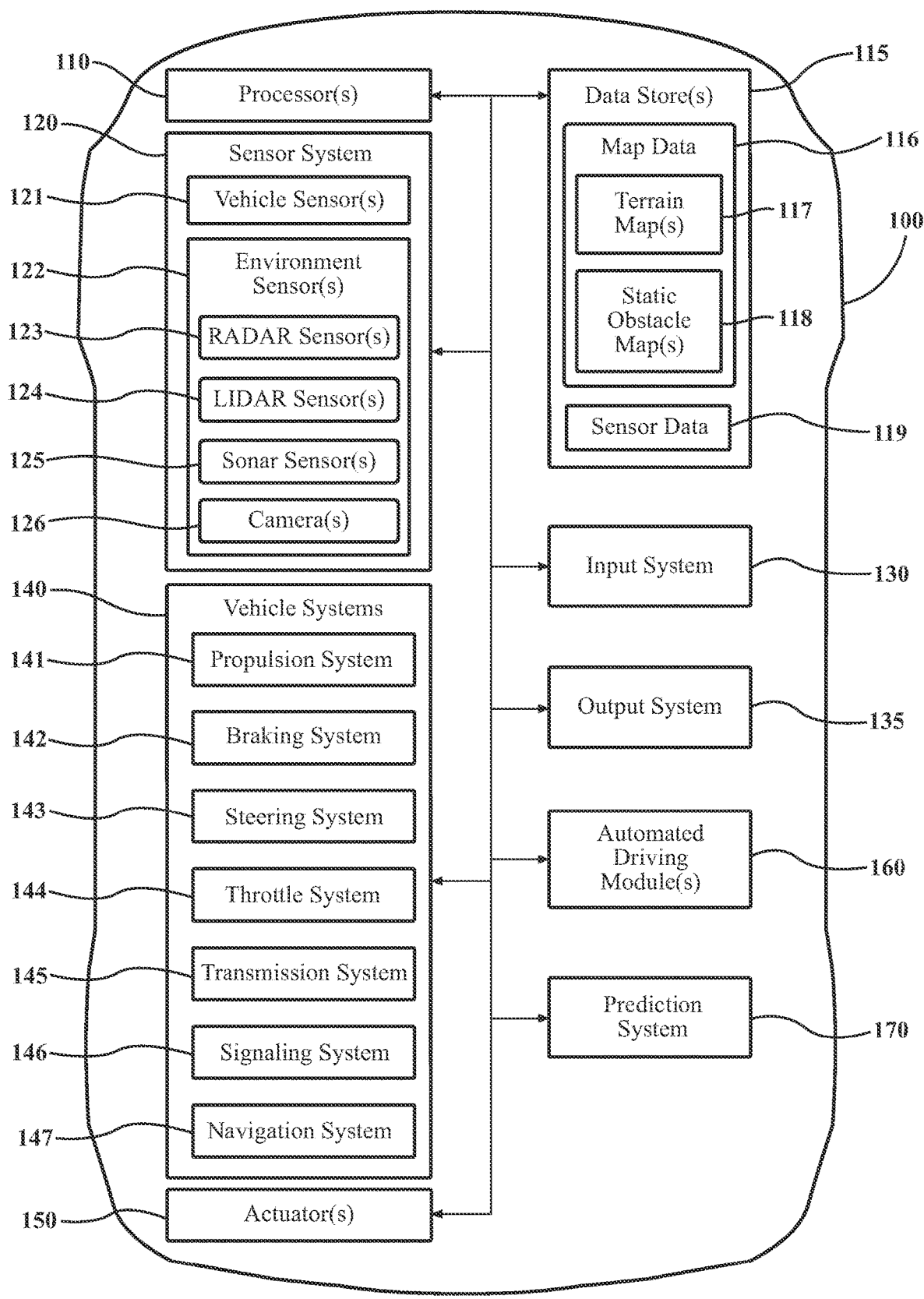
FIG. 1 illustrates one embodiment of a vehicle within which systems and methods disclosed herein may be implemented.

Systems, methods, and other embodiments associated with estimating reachable states for a vehicle using a neural model are disclosed herein. In various implementations, systems using projected paths generated by an automated driving system (ADS) and a predictive controller for maneuvering encounter difficulties from complex events. For example, systems using a model predictive controller (MPC) can generate riskier commands in circumstances such as when the ADS causes a lane change on a road at nighttime. Here, the system may be unable to automatically generate a driving command from the MPC and avoid a collision with objects (e.g., other vehicles, an animal, etc.) due to dim lighting, lane complexity, and so on. Therefore, in one embodiment, a prediction system uses neural reachability to estimate reachable states for a projected path generated by the ADS. In particular, the prediction system estimates possible states using a neural network (NN) model under initial conditions and control disturbances associated with a driving command. Here, a reachable state can be a set having positions and orientations for the vehicle within a bounded time and a state space related to the initial condition and the projected path. Features of a reachable state may include velocity, a steering angle, and so on within conservative handling limits for the projected path. Furthermore, the prediction system uses a driving command from a safety controller when the NN model estimates a logical intersection between a reachable state and an unsafe set indicating a possible collision, such as from insufficient vehicle separation. Conversely, the prediction system determines that driving commands are estimated as being safe when collisions with obstacles (e.g., other vehicles) are unlikely for behaviors associated with the projected path. In addition, the prediction system uses the NN model to estimate reachable states associated with multiple controllers generating driving commands for various initial conditions. In this way, the prediction system can include complex control systems for advanced maneuvering with efficient computations using the NN model while maintaining safety and smooth motion.

In various implementations, the prediction system trains the NN model using simulated data and a template polyhedra. In particular, the template polyhedra may define coefficients for the NN model associated with direction and involve a trajectory set for the vehicle. Here, the NN model trains per coefficient relative to the trajectory set and constraints including bounded directions and a control action. The prediction system may iteratively and in parallel train the NN model by minimizing a loss function that reduces the likelihood of the NN model estimating reachable states that are unsafe erroneously as safe. In addition, the loss function over-approximates conservative states by increasing estimates by the NN model of reachable states that are safe. Furthermore, the prediction system combines outputs from parallel computations per coefficient into a fixed polyhedral for a direction and a path image from a set of template directions. Accordingly, the prediction system trains the NN model to estimate reachable states for the vehicle efficiently and to select vehicle commands that maintain safety during implementation.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, a prediction system 170 uses road-side units (RSU), consumer electronics (CE), mobile devices, robots, drones, and so on that benefit from the functionality discussed herein associated with estimating reachable states for a vehicle using a neural model.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes the prediction system 170 that is implemented to perform methods and other functions as disclosed herein relating to estimating reachable states for a vehicle using a neural model.

Figure 2:
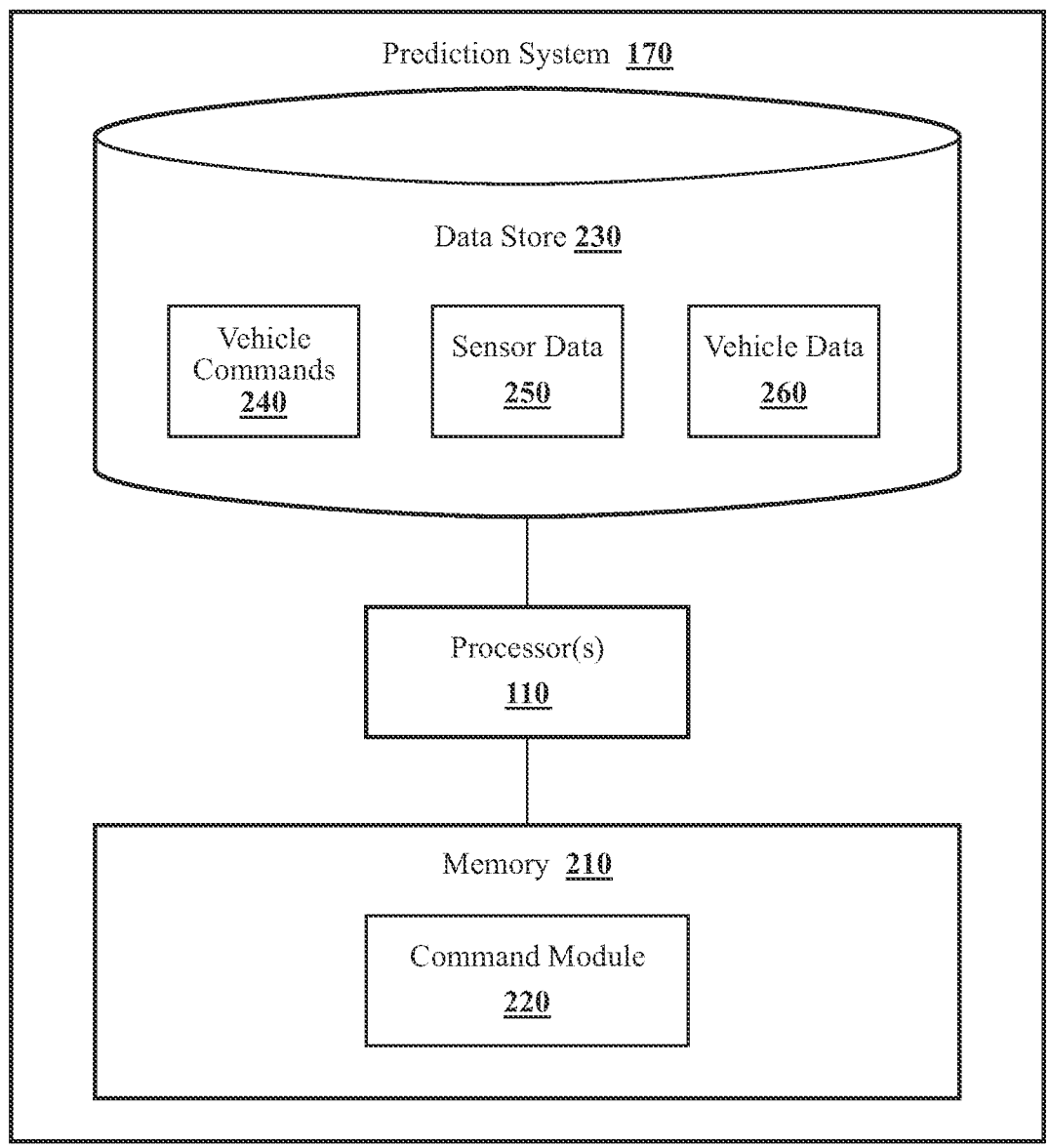
FIG. 2 illustrates one embodiment of a prediction system that is associated with estimating reachable states for the vehicle using a neural model.

With reference to FIG. 2, one embodiment of the prediction system 170 of FIG. 1 is further illustrated. The prediction system 170 is shown as including a processor(s) 110 from the vehicle 100 of FIG. 1. Accordingly, the processor(s) 110 may be a part of the prediction system 170, the prediction system 170 may include a separate processor from the processor(s) 110 of the vehicle 100, or the prediction system 170 may access the processor(s) 110 through a data bus or another communication path. In one embodiment, the prediction system 170 includes a memory 210 that stores a command module 220. The memory 210 is a random-access memory (RAM), a read-only memory (ROM), a hard-disk drive, a flash memory, or other suitable memory for storing the command module 220. The command module 220 is, for example, computer-readable instructions that when executed by the processor(s) 110 cause the processor(s) 110 to perform the various functions disclosed herein.

With reference to FIG. 2, the command module 220 generally includes instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided for herein, the command module 220, in one embodiment, acquires the sensor data 250 that includes at least camera images. In further arrangements, the command module 220 acquires the sensor data 250 from further sensors such as radar sensors 123, LIDAR sensors 124, and other sensors as may be suitable for identifying vehicles and locations of the vehicles.

Moreover, in one embodiment, the prediction system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the command module 220 in executing various functions. In one embodiment, the data store 230 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on. In one embodiment, the data store 230 further includes the vehicle commands 240 and the vehicle data 260. The vehicle commands 240 may include a steering angle, throttle value, braking value, and so on for the vehicle 100 to execute. As explained below, the vehicle data 260 may include executed maneuvers, vehicle states (e.g., tilt, direction, etc.), perception data, and so on from the sensor system 120 for the executed maneuvers.

Figure 3A:
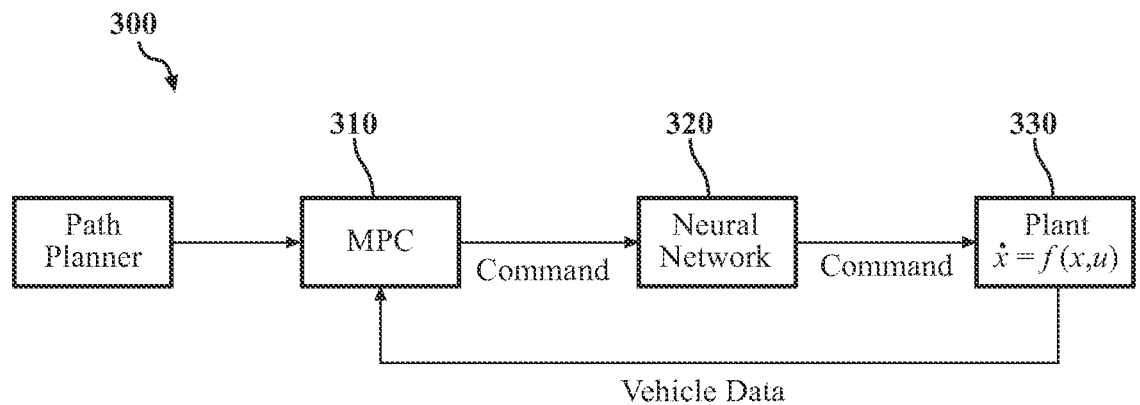
FIG. 3A illustrates one embodiment of the prediction system using a model predictive controller (MPC) with the neural model for estimating reachable states.

Turning now to FIG. 3A, one embodiment of the prediction system 170 using a MPC 310 with a neural model for estimating reachable states is illustrated in the system 300. Here, the command module 220 includes instructions that cause the processor(s) 110 to generate a command using the MPC 310, which implements a model for solving an optimization problem associated with a projected path. In particular, the command may be a reference for the vehicle 100 associated with the projected path generated by an ADS during online operation. For example, online operation and monitoring involves the prediction system 170 computing vehicle commands while the vehicle 100 is actually traveling on a road. Although the MPC 310 is illustrated, the prediction system 170 can use any controller to generate unverified, partially unverified, and so on, driving commands for a projected path. A driving command may be unverified when a path involves complex maneuvers having uncertain vehicle dynamics.

Figure 3B:
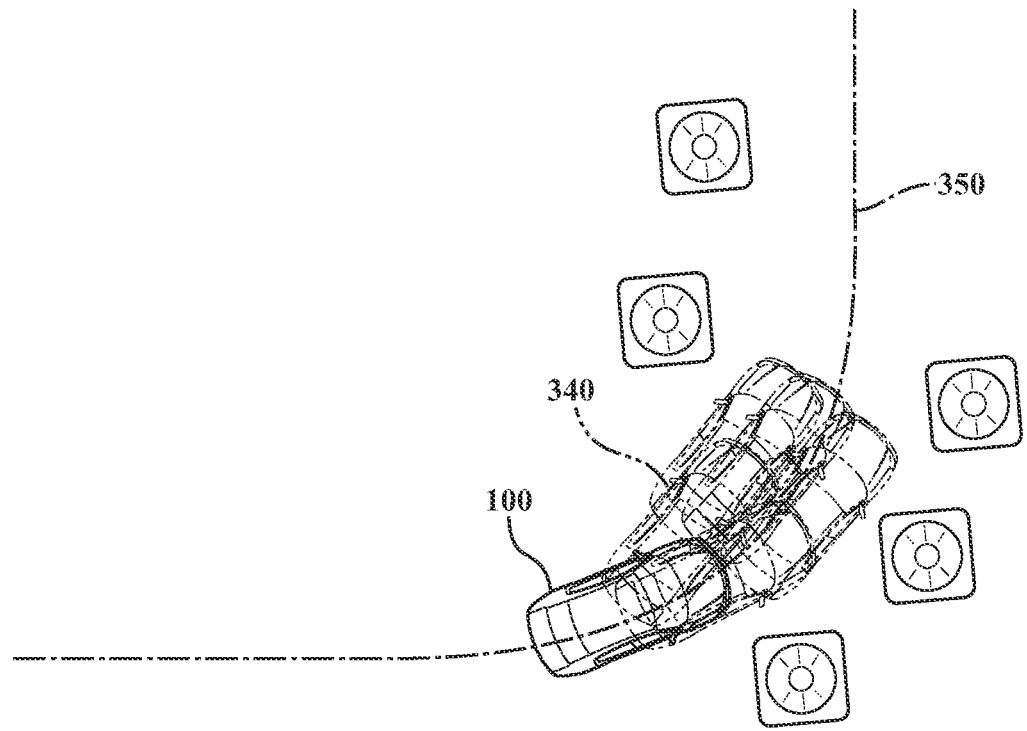
FIG. 3B illustrates an example of reachable states for the vehicle associated with a projected path.

Moreover, the NN 320 (e.g., a deep NN (DNN)) approximates reachable states online that are conservative and likely within a bounded time. For example, FIG. 3B shows the reachable states 340 for the projected path 350 generated by a path planner of the ADS. In one approach, a reachable state has sets including positions and orientations for the vehicle 100 within the bounded time and a state space related to an initial condition and the projected path 350. As previously explained, features of a reachable state may include velocity, a steering angle, jerk parameters, and so on of the vehicle 100 within conservative handling limits approximated by the NN 320. As such, the reachable states 340 can incorporate possible disturbances, permitted steering angles, related drift distances, slip distances, and so on associated with the vehicle 100.

The NN 320 estimating the reachable states 340 may involve factoring feature details and uncertainty of the vehicle 100. In one approach, the estimates involve factoring the dimensions of the whole vehicle rather than the rear-axle center. For example, the prediction system 170 uses a Minkowski sum that accounts for the dimensions and possible orientations associated with a reachable state computed using an approximation of a rear-axle center. Here, a box can represent a vehicle of length $l_c$ (e.g., 2.5 meters (m)) and width $w_c$ (e.g., 2 m). The rear-axle center can be at point (0, 0).

Regarding uncertainty for vehicle orientation from varying dynamics, the prediction system 170 may train neural networks within the NN 320 to learn reachable orientations $R_\theta$. Here, the maximum and minimum orientation of the vehicle 100 in a time interval and a median orientation $\theta_{mid}$ are computed. As such, the prediction system 170 calculates the maximum uncertainty in orientation by considering the maximum deviation of reachable orientations from the computed median orientation $\theta_{mid}$:

$$\Delta\theta = \max_{\theta^* \in \mathcal{R}_\theta} |\theta^* - \theta_{mid}|. \qquad \text{Equation (1)}$$

Then, the prediction system 170 computes a set representing all the reachable orientations of the vehicle $R_c$ by rotating an enlarged box by $\theta_{mid}$. The full reachable state $R_T$ is computed using the Minkowski sum of a vehicle occupation set $R_c$ and possible positions of the rear-axle center $R_s$ predicted by the NN 320:

$$\mathcal{R}_T = \mathcal{R}_c \oplus \mathcal{R}_s. \qquad \text{Equation (2)}$$

As such, the prediction system 170 improves approximations by the NN 320 for the reachable states 340 by factoring vehicle dimensions and movement uncertainty.

Still referring to FIG. 3A, a plant model 330 may estimate vehicle dynamics using the command outputted by the NN 320. As explained below, the command may be similar to that outputted by MPC or a different command according to the computed reachable states. Furthermore, the MPC receives the vehicle data 260 to evaluate performance and iteratively adjust subsequent commands through a closed loop, thereby improving accuracy. In addition, the prediction system 170 may train the NN 320 to use a fixed layer structure for predictable computation times and efficient performance, particularly involving complex paths generated by the ADS. In one approach, the NN 320 computes the reachable states 340 using MPC computations, and if the states are unsafe, the command outputted by the prediction system 170 halts the vehicle 100.

Moreover, the vehicle dynamics may be defined as:

$$\dot{x} = \begin{bmatrix} \dot{x}_1 \\ \dot{x}_2 \\ \dot{\theta} \\ \dot{v} \end{bmatrix} = \begin{bmatrix} v \cdot \cos(\theta) \\ v \cdot \sin(\theta) \\ v \cdot \tan(u_\delta)/L \\ u_a \end{bmatrix}. \quad \text{Equation (3)}$$

Here, the vehicle dynamics are relative to the rear-axle center in a vehicle-like model. The state $x \in \mathbb{R}$ includes a vehicle location $(x_1, x_2)$, a heading angle or vehicle orientation $\theta$, and the vehicle speed $v$. The inputs are the steering angle $u_\delta$ and acceleration $u_a$. Disturbances in position and orientation during motion can include uncertainty of vehicle dynamics using the range $[-0.1, 0.1]$. Regarding the system 300, the MPC 310 may generate a number of commands based on the prediction horizon and the sample time for the projected path 350. The prediction system 170 can assign a command for time step k defined by the sample time. For example, the MPC 310 using a prediction horizon of 2 seconds (s) and a sample time of 0.4 s returns five sequential commands for each input. As such, the NN 320 can process ten inputs for this configuration.

Figure 4:
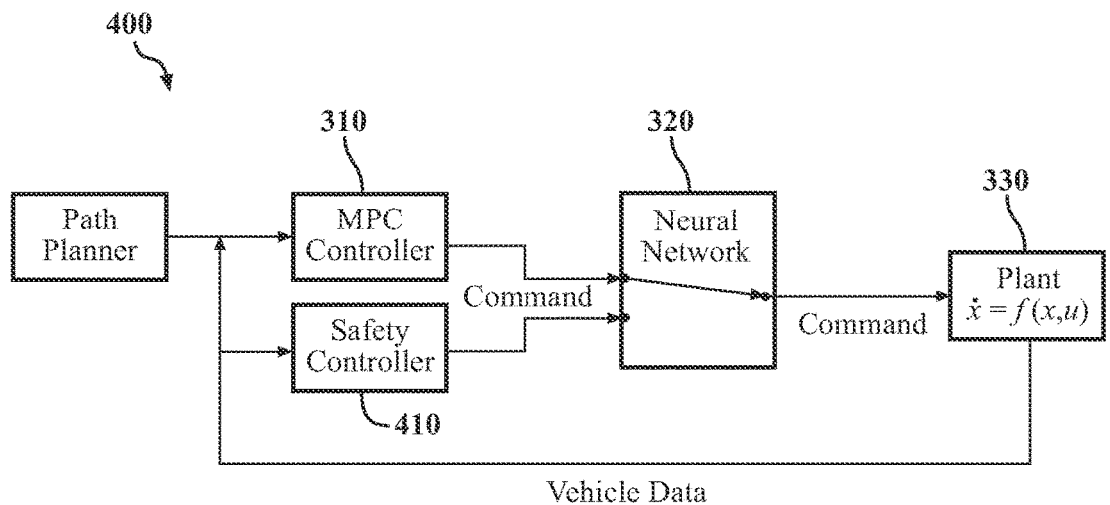
FIG. 4 illustrates one embodiment of the prediction system using a safety controller with the neural model for selecting driving commands associated with the projected path.

In various implementations, the prediction system 170 uses a MPC with the neural model including additional controllers. FIG. 4 illustrates one embodiment of the prediction system 170 using a safety controller 410 with the neural model for selecting driving commands 400 associated with the projected path. Here, the NN 320 functions as a decision component in a simplex architecture for safe fallback from a complex controller (e.g., MPC) to a safety controller. In one approach, the NN 320 includes a plurality of NNs according to template directions. For example, the prediction system 170 implements eight NNs for octagonal direction in a two-dimensional space. Inquiries can be processed concurrently and in parallel since a NN outputs a support value for a given direction and time step, thereby reducing computation times online.

Furthermore, the NN 320 can identify safe and unsafe maneuvers for complex scenarios by measuring motion certainty through concurrent and iterative computations. A trajectory, maneuver, or path may become unverified from the uncertainty of vehicle dynamics. Also, the prediction system 170 can identify unsafe driving commands using iterative computations with the NN 320 before computing the complete reachable states, thereby saving computation costs. Other computation savings involve the prediction system 170 computing reachable states in reverse order from time step k=100 to k=1 online and checking for intersections with unsafe regions associated with the projected path 350. In this way, the prediction system 170 identifies unsafe and safe commands sooner and more efficiently.

Regarding the simplex architecture, in FIG. 4 an advanced controller (e.g., MPC) may generate unverified driving commands for complex maneuvers (e.g., a lane change). The safety controller 410 may be a baseline controller that generates verified driving commands for basic maneuvers (e.g., vehicle following). For example, the MPC 310 is wrapped with the safety controller 410 to avoid collisions involving static and dynamic obstacles along a projected path. Here, the safety controller 410 may implement a follow-the-gap or intersection crossing model to safely avoid collisions using lower-risk commands and maneuvers.

Furthermore, in various implementations, the prediction system 170 in 400 gives the MPC 310 default control for a projected path generated by the ADS. Meanwhile, the NN 320 continuously checks the safety of unverified sequences involving driving commands and initial conditions by approximating corresponding reachable states. The vehicle 100 switches to the safety controller 410 and executes a maneuver (e.g., follow-the-gap) with the safety command for the projected path upon determining that the reachable states satisfy collision criteria. The safety controller 410 retains control until a sequence of the MPC 310 is deemed safe. At this point, the prediction system 170 may switch control of the vehicle 100 back to the MPC 310 and follow projected paths subsequently generated by the ADS using the MPC 310. In one approach, the prediction system 170 uses the vehicle data 260 for the MPC 310 and the safety controller 410 to improve the accuracy of driving commands. For example, the prediction system 170 prevents over-conservative switching to the safety controller 410. The vehicle data 260 can also reduce switching times between controllers by accounting for motion uncertainties.

Figure 5:
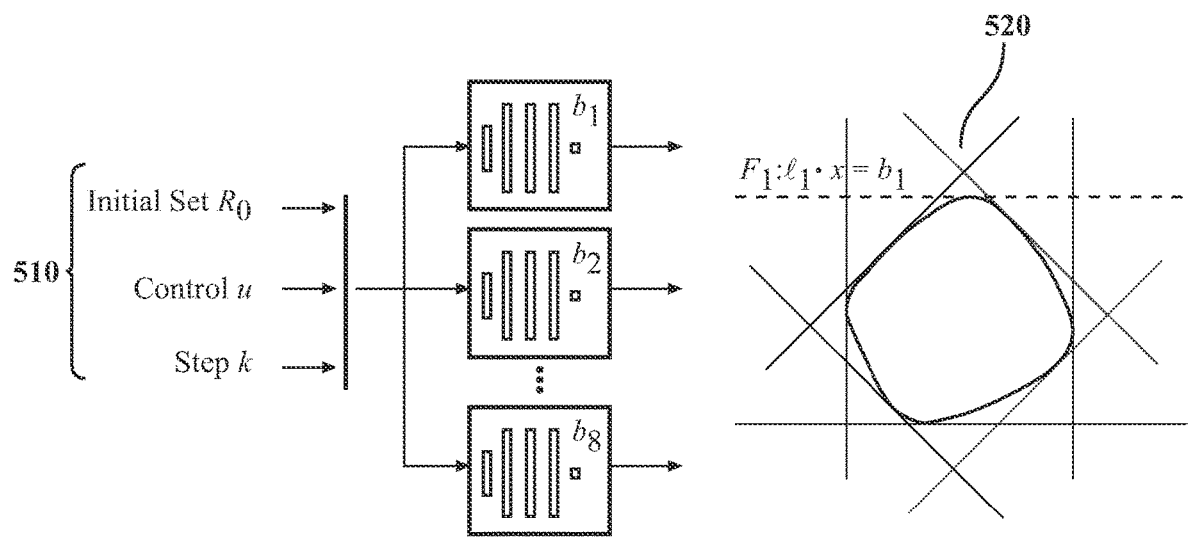
FIG. 5 illustrates one embodiment of training the prediction system to use the neural model for efficiently estimating reachable states.

Turning now to training, FIG. 5 illustrates one embodiment of training the prediction system 170 to use the neural model for efficiently estimating reachable states. Here, training involves using simulated data and a template polyhedra 520 to iteratively learn reachable states by the NN 320. For example, the simulated data includes precomputed reachable states or sets of the system represented as a template polyhedra. The template polyhedra 520 can be a convex polyhedron defined by a set of half-spaces perpendicular to a direction in a finite set. A template polyhedra may be associated with a set representation of reachable states, where a neural network is trained and utilized for the computations of vector coefficients. As previously explained, the NN 320 may involve octo-directionality for estimating the reachable states 340. As such, the prediction system 170 can use eight NNs running in parallel to estimate efficient parameters $b_i$ using a template polyhedra having fixed directions.

The following describes training details for the NN 320. Let $\mathbb{R}$ be the set of real numbers and $\mathbb{R}_+$ is the set of non-negative real numbers. Also, $\mathbb{N}$ is the set of natural numbers including 0. Given two sets A and B, $B^A$ denotes the set of all functions from A and B. That is, for any $f \in B^A$ we have $f: A \to B$. Let $T \in \mathbb{R}_+$ denote the bounded simulation time.

Moreover, training may model an ADS as follows. The prediction system 170 fixes $R=[0, T] \subseteq \mathbb{R}_+$. A system $\Sigma$ can be a mapping from initial conditions $\mathcal{R}_0 \subseteq X$, control input signals $U \subseteq U^R$, and input disturbance $W \subseteq W^R$ to output signals $Y^R$. Here, U can be a compact set of input values (e.g., input space) at a time point, W a compact set of input disturbances which are bounded by an interval $[\underline{w}_i, \overline{w}_i]$ for each dimension i, and Y a set of output values (e.g., output space). A bounded-time execution may be viewed as a function $\Delta_\Sigma: \mathcal{R}_0 \times U \times W \times \mathbb{R}_+ \to Y^R$, which takes as an input an initial state $r_0 \in \mathcal{R}_0$, a control input signal $u \in U$, an input disturbance $w \in W$, and bounded time $t \in \mathbb{R}_+$. As such, the prediction system 170 can generate a unique trajectory $\eta: \mathbb{R}_+ \to Y$ for deterministic computations.

Regarding modeling the reachability problem, the prediction system 170 computes the possible states starting from an initial region given a set of initial states. Formally, the reachable state or set of the system at time $t \in \mathbb{R}_+$, from a set of initial conditions $\mathcal{R}_0$, can be expressed as:

$$\text{Reach}_t(\mathcal{R}_0) = \{\eta(t) | r_0 \in \mathcal{R}_0, u \in U, w \in W, \eta = \Delta_\Sigma(r_0, u, w, t)\}. \quad \text{Equation (4)}$$

The reachable state for a time interval $I = [T_{start}, T_{end}]$ can be expressed as:

$$\text{Reach}_I(\mathcal{R}_0) = \cup_{t \in I} \text{Reach}_t(\mathcal{R}_0). \quad \text{Equation (5)}$$

Regarding further computations, a recurrent neural network (RNN) is a function that receives time-series (e.g., sequential) data $x(t)$ as inputs, where $t \in \{0, 1, \ldots T\}$ and generates an output sequence in the output space $Y \subseteq \mathbb{R}^n$. The output of a RNN at time t can be a function over the input at time t and the output of the hidden state at time t−1. Specifically:

$$a(t) = W_{hh} \cdot h(t-1) + W_{hx} \cdot x(t) + b_h, \quad \text{Equation (6)}$$

$$h(t) = \theta(a(t)), \quad \text{Equation (7)}$$

$$y(t) = W_{hy} \cdot h(t) + b_y, \quad \text{Equation (8)}$$

where $W_{hh}$, $W_{hx}$ are weight matrices, $b_h$, $b_y$ are bias vectors, and $\theta$ in Equation (7) is an activation function. Here, the structure of hidden states may function as a memory of a network and a current output is conditioned on a previous state. As such, RNNs can capture complex signals that span over multiple time periods.

Moreover, Minkowski sums can compute the vector sum of each pair of points in convex shapes. Accordingly, they allow the summation of convex polygons. The Minkowski sum of two sets A and B is defined as a set with the sum of all elements from A and B, such that:

$$X \oplus Y := \{x + y : x \in X \text{ and } y \in Y\}. \quad \text{Equation (9)}$$

In various implementations, the prediction system 170 approximates the reachable states 340 of deterministic and dynamical systems in bounded time as follows. Given a system $\Sigma$, set of conditions U, a disturbance W, and bounded time interval $I = [T_{start}, T_{end}]$, the NN 320 can estimate the reachable state of the system $\text{Reach}_I(\mathcal{R}_0)$ through a DNN and training as follows:

TABLE 1

Algorithm 1 Learning DNN for Reachability Analysis

Input: Template directions m; disturbance set W; time horizon T; time step $\Delta t$; training data sets $\mathcal{D}_i = \{\mathcal{R}_0, u, k, b_i\}$ for i = 1 : m; data set length Len; desired under-approximations. level $\epsilon$, state space X; loss function L
Output: DNN $\mathcal{N}$
Function TRAIN(u, X, W, T, $\Delta t$)
  for k = 1 : Len do
    u, $\mathcal{R}_0 \leftarrow$ RAND(U), RAND(X)    # generate random control u, and initial $\mathcal{R}_0$ from the state space
    $\vec{b} \leftarrow$ COMPUTEREACH(u, $\mathcal{R}_0$, T, $\Delta t$)    # compute template polyhedron coefficient vector $\vec{b}$ of size m
    for i = 1 : m do
      $\mathcal{D}_i \leftarrow \mathcal{D}_i \cup \{\mathcal{R}_0, u, k, b_i\}$    # append to dataset
    end for
  end for
  $\mathcal{N} \leftarrow$ GRAD($\mathcal{D}$, L)    # Gradient descent with biased or MSE loss function
  if RETRAIN then
    $\mathcal{N} \leftarrow$ RETRAIN($\mathcal{N}$)    # Reduce under-approximations
  end if
  return $\mathcal{N}$
Function RETRAIN($\mathcal{N}$)
$u_{frac} \leftarrow$ fraction of under-approximate training data
while $u_{frac} > \epsilon$ do
  $\mathcal{D}_{retrain} \leftarrow$ GETUNDERAPPROXIMATIONS($\mathcal{D}$, $\mathcal{N}$)
  Retrain $\mathcal{N}$ with $\mathcal{D}_{retrain}$
end while
return $\mathcal{N}$
Function GETUNDERAPPROXIMATIONS($\mathcal{D}$, $\mathcal{N}$)
Forward propagate learned model $\mathcal{N}$ on dataset $\mathcal{D}$ to obtain $\{b_i^{pred}\}_{k=1}^L$
for bipred $\in \{b_i^{pred}\}_{k=1}^L$ do
  if $b_i^{pred} < b_i$ then
    $\mathcal{D}_{retrain} \leftarrow \mathcal{D}_{retrain} \cup \{\mathcal{R}_0, u, k, b_i\}$
  end if
end for
return $\mathcal{D}_{retrain}$ As previously explained, the prediction system 170 can use a template polyhedra for training the NN 320 to approximate reachable states. The template polyhedra may be a set representation with predefined normal vectors. In one approach, given a set $\mathcal{D} = \{\ell_1 \ldots \ell_m\}$ of vectors in $\mathbb{R}^n$ called template directions, a template polyhedron $\mathcal{P}_D \subseteq \mathbb{R}^n$ is a polyhedron where there exists coefficients $\{b_1 \ldots b_m\} \in \mathbb{R}$ such that $\mathcal{P}_D = \{x \in \mathcal{P}_D \subseteq \mathbb{R} \mid \bigwedge_{\ell_i \in D} \ell_i \cdot x \leq b_i\}$. Here, a template polyhedron can represent sets by defining the vector of coefficients $b_i$. The NN 320 can predict the coefficient $b_i$ for each predefined direction $\ell_i$. Furthermore, the inputs 510 are the initial set $\mathcal{R}_0$, represented with box directions using support functions, control actions u, and a time step k. Box directions can represent a bounding box for the initial set and describe upper and lower bounds on positions (x, y), orientation θ, and velocity v. The prediction system 170 can remove reliance on (x, y) and orientation θ and use v as the input for the initial set. In this way, the box input is reduced to the upper and lower bounds on initial velocity v, thereby simplifying computations.

Furthermore, support functions relate to coefficients having a predefined direction and a predefined period. A neural network can have a predefined direction and outputs a predicted support value corresponding to the predefined direction. The support value is a scalar value that coupled with the support direction gives the support function. For example, a set of octagonal directions has eight support values corresponding to eight support directions for eight neural networks. In addition, the prediction system 170 can represent a control action for every time sample of the MPC 310 as a tuple $[u_{a_i}, u_{\delta_i}]$. Here, $u_{a_i}$ is the acceleration input and $u_{\delta_i}$ is the steering angle input. For example, the prediction system 170 uses ten control inputs for five control tuples $[u_{a_i}, u_{\delta_i}]$ in a given time horizon (e.g., 2 s).

In one approach, the prediction system 170 combines the outputs $b_i^{pred}$ from n neural networks and forms a polyhedral path or reach image with a fixed direction and n template directions within a time interval. The number of template directions of the polyhedron can depend on applications for the vehicle 100. A higher number allows a tighter over-approximation of the reachable states, but increases the number of neural networks n for computations. Regarding details of the time step k, the NN 320 computes the set $Reach_{[(k-1)\Delta t, k\Delta t]}(R_0)$ when provided with the time step k as input for a target time interval. Here, we assume that the time frame [0, T] is divided into T/Δt partitions of size Δt.

As previously explained, the prediction system 170 during training generates the vector of coefficients $b_i$ for each predefined direction $\ell_i$. For example, an individual neural network trains to learn a coefficient $b_i$ for each octagonal direction in FIG. 5. Regarding loss minimization, a gradient descent employing a mean square error (MSE) loss function can train the NN 320 through the Algorithm 1. In one approach, the prediction system 170 uses recurrent layers to capture salient properties of the reachable states 340. In this configuration, a NN 320 after training can include three hidden layers with 200 neurons per layer. In one approach, the prediction system 170 appends a feed-forward layer for outputting the coefficient $b_i$ to complete computations.

The prediction system 170 also reduces inaccuracies when estimating the reachable states 340 due to approximations by the NN 320. In other words, the NN 320 can over-approximate or under-approximate the reachable states 340. Under-approximation may mean that unsafe states are identified as safe, thereby causing safety hazards. As such, the prediction system 170 avoids under-approximations of the reachable states 340, whilst optimizing over-approximations for accuracy and avoiding over-conservativeness (i.e., safe state identified as unsafe). For example, bloating, a biased loss function, or iterative retraining can favor over-approximations over under-approximations of the reachable states 340 through training with the Algorithm 1. Here, an outputted driving command can be bloated by a conservative, empirical factor that is tuned for different driving scenarios. Furthermore, a biased loss function can increase the weighting for over-approximations while training the NN 320. In other words, the training penalizes the NN 320 more for under-approximations. In post-training, the prediction system 170 identifies under-approximations to iteratively retrain the NN 320 with a biased loss function. This refinement can make the output reachable state more conservative and reduce the number of under-approximations.

In various implementations, the prediction system 170 tests the NN 320 after training and reducing under-approximations using a statistical model. A statistical model may be a sequential probability ratio test such as Wald's sequential probability ratio test (SPRT) that utilizes limited iterations, thereby reducing computations. Here, the prediction system 170 can use hypothesis testing that verifies the predicted support values for a reachable state having accuracy $\mathcal{P}_A \geq \theta_A$ whilst maintaining a level of under-approximations in data below $\mathcal{P}_U \leq \theta_U$. The hypothesis testing may be associated with confidence intervals (α, β) that quantifies test strength. In one approach, the prediction system 170 adds a small indifference region δ for realistic testing. As such, the test can compare $H_0: \mathcal{P}_A \geq \theta_x + \delta$ against $H_1: \mathcal{P}_A \leq \theta_x - \delta$. In this way, the NN 320 produces reachable states that are accurate while avoiding under-approximations.

In addition, training may reduce state spaces for the training data by identifying invariant variables that are unrelated to vehicle behavior. In other words, vehicle dynamics and reachable states are indifferent to the initial position and orientation of the vehicle 100. The prediction system 170 can later account for the invariant variables during post-processing by translation and rotation of the reachable state, respectively. As such, the training data can have an initial position and orientation set to zero for reducing the state spaces and inputs to the NN 320. Instead, the state input to the neural network is the initial velocity since initial position and orientation are zero and may be impertinent to generating reachable states. For example, the NN 320 has twelve inputs with one state input, ten control inputs for the sequence of driving commands, and the time step k. In this way, the NN 320 utilizes less computations and complexity for training.

Figure 6:
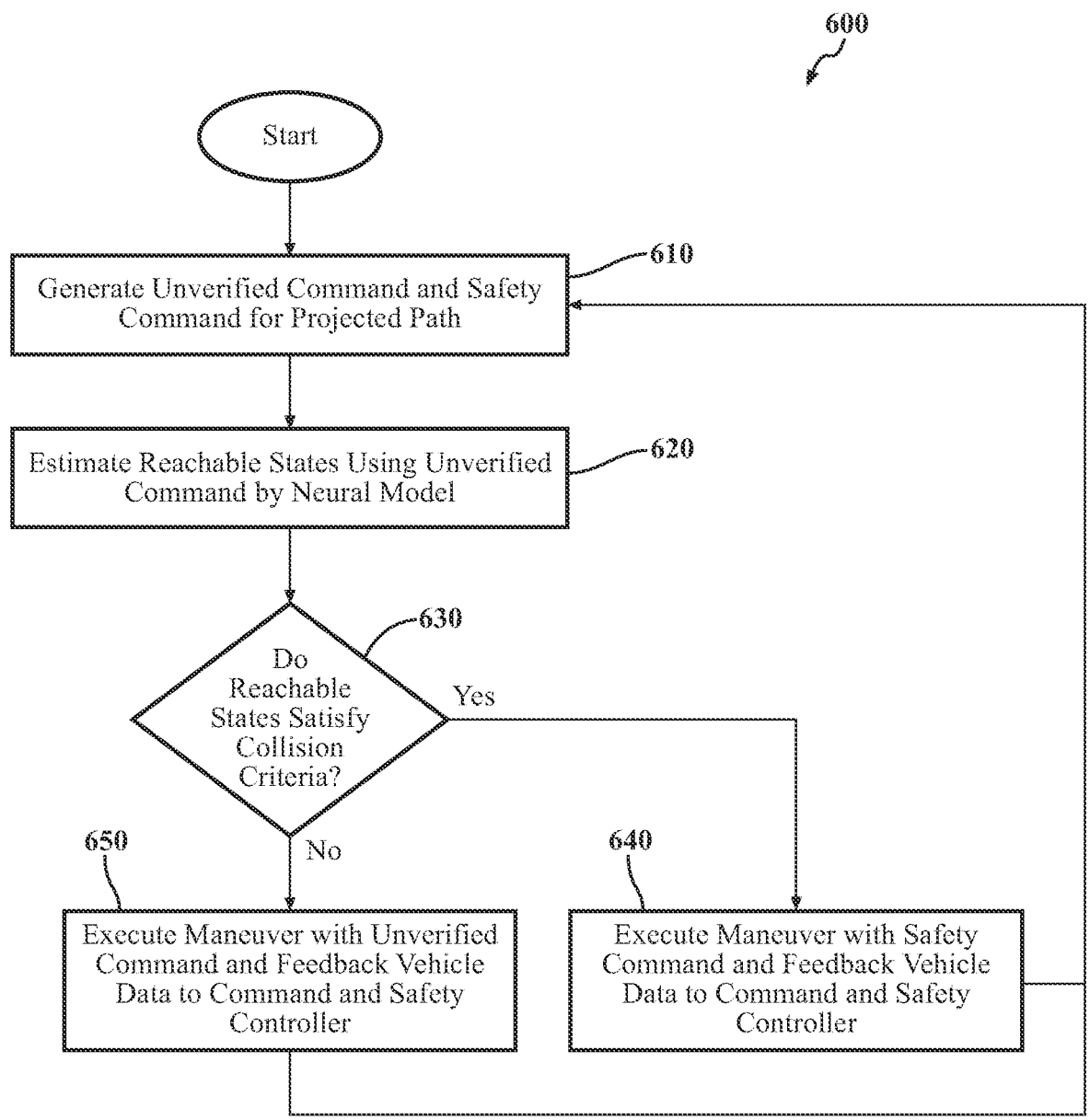
FIG. 6 illustrates one embodiment of a method that is associated with the prediction system selecting driving commands using the neural model that estimates reachable states.

Turning now to FIG. 6, a flowchart of a method 600 that is associated with the prediction system 170 selecting driving commands using a neural model that estimates reachable states is illustrated. Method 600 will be discussed from the perspective of the prediction system 170 of FIGS. 1 and 2. While method 600 is discussed in combination with the prediction system 170, it should be appreciated that the method 600 is not limited to being implemented within the prediction system 170 but is instead one example of a system that may implement the method 600.

At 610, the command module 220 generates an unverified command and a safety command for a projected path generated by an ADS. As previously explained, an advanced controller that generates a driving command may be unverified when the projected path for the vehicle 100 involves a complex maneuver (e.g., a lane change) having uncertain vehicle dynamics. Conversely, a baseline controller generates verified driving commands for basic maneuvers (e.g., vehicle following). For example, a MPC generates the unverified command for a lane change during nighttime. A safety controller can utilize a vehicle gap model that generates the safety command for gap-following within traffic.

At 620, the prediction system 170 estimates reachable states using the unverified command by the NN 320. A reachable state may include positions and orientations for the vehicle 100 within a bounded time and a state space related to an initial condition and the projected path. In one approach, features of a reachable state include velocity, a steering angle, jerk parameters, and so on associated with the vehicle 100 within conservative handling limits approximated by the NN 320. As such, reachable states can incorporate possible disturbances, permitted steering angles, related drift distances, slip distances, and so on of the vehicle 100.

Moreover, the NN 320 estimates a logical intersection between a reachable state and an unsafe set indicating a possible collision, such as from insufficient vehicle separation, through the previously explained computations. The NN 320 also estimates that driving commands are safe when collisions with obstacles (e.g., other vehicles) appear unlikely for possible behaviors associated with the projected path. Furthermore, the NN 320 excludes a subset of conservative states having safe maneuvers and excludes reachable states that are unsafe erroneously identified as safe from under-approximations. In this way, the prediction system 170 avoids over-conservative estimations and reduces the number of under-approximations, thereby improving comfort and safety.

In one approach, the prediction system 170 trains the NN 320 to identify unsafe driving commands before computing the complete reachable states using iterative computations, thereby saving computation costs. The prediction system 170 can also compute reachable states in reverse order from time steps (e.g., k=100 to k=1) online and checking for intersections with unsafe regions associated with the projected path. In this way, the prediction system 170 reduces computation costs and improves reliability by rapidly identifying intersections of unsafe states.

At 630, the prediction system 170 determines when the reachable states satisfy collision criteria. Here, the collision criteria can include a distance to road hazards, proximity to longitudinal traffic, and an intersection layout associated with the environment of the vehicle 100. The NN 320 may estimate a logical intersection between a reachable state and an unsafe set indicating a possible collision. Also, the prediction system 170 avoids identifying a safe state as unsafe by limiting over-approximations of reachable states.

At 640, the prediction system 170 executes a maneuver with the safety command and feeds back vehicle data to a command controller (e.g., MPC) and the safety controller when the collision criteria are satisfied. For example, the NN 320 determines that the driving command associated with the projected path will likely cause a collision with an object (e.g., other vehicles, a tree, a guardrail, etc.). The likelihood of the collision can be associated with the uncertainty of vehicle dynamics in reachable states for the unverified command. As such, the prediction system 170 switches control to following-traffic related commands from the safety controller. The prediction system 170 returns to 610 and the safety controller retains control until a sequence from the command controller is deemed safe. At this point, the prediction system 170 may switch control of the vehicle 100 back to the command controller to follow projected paths subsequently generated by the ADS.

In one approach, the prediction system 170 uses the vehicle data 260 for the command controller and the safety controller to improve the accuracy of driving commands by preventing over-conservatism. For example, the NN 320 repeatedly switches to the safety controller when a safe unverified command is deemed unsafe. The vehicle data can also reduce switching times between controllers by accounting for motion uncertainties, such as by optimizing over-approximations and under-approximations.

At 650, the prediction system 170 executes a maneuver with the unverified command and feeds back vehicle data to the command controller and the safety controller when the collision criteria are unsatisfied. The NN 320 estimates driving commands as safe when collisions with obstacles (e.g., other vehicles) are unlikely for possible behaviors associated with the projected path and the reachable states. In one approach, the NN 320 identifies safe and unsafe maneuvers for complex scenarios by measuring motion certainty along the projected path through concurrent and iterative computations. A trajectory, maneuver, or path may become unverified due to the uncertainty of vehicle dynamics. Accordingly, the prediction system 170 implements the NN 320 to estimate reachable states for the vehicle efficiently and select vehicle commands that maintain safety and comfort.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the prediction system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110, the prediction system 170, and/or the automated driving module(s) 160 may control some or all of the vehicle systems 140 and, thus, may be partially or fully autonomous as defined by the society of automotive engineers (SAE) levels 0 to 5.

The processor(s) 110, the prediction system 170, and/or the automated driving module(s) 160 can be operatively connected to communicate with the various vehicle systems 140 and/or individual components thereof. For example, returning to FIG. 1, the processor(s) 110, the prediction system 170, and/or the automated driving module(s) 160 can be in communication to send and/or receive information from the various vehicle systems 140 to control the movement of the vehicle 100. The processor(s) 110, the prediction system 170, and/or the automated driving module(s) 160 may control some or all of the vehicle systems 140.

The processor(s) 110, the prediction system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the prediction system 170, and/or the automated driving module(s) 160 can control the direction and/or speed of the vehicle 100. The processor(s) 110, the prediction system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the prediction system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-6 but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A prediction system comprising:
   a processor; and
   a memory storing instructions that, when executed by the processor, cause the processor to:
   generate an unverified command by a first controller and a safety command by a second controller for a projected path by an automated driving system (ADS) associated with a vehicle, and the first controller is a model predictive controller (MPC) that is different than the second controller;

estimate reachable states by a neural network (NN) model that uses the unverified command and an initial condition for the vehicle, the reachable states include a velocity, a steering angle, and a tilt for the vehicle within a bounded time and a state space associated with the initial condition and the projected path, and the reachable states exclude a subset of conservative states having safe maneuvers and exclude predicted reachable states that are unsafe associated with the projected path; and upon determining that the reachable states satisfy collision criteria, execute by the vehicle a maneuver with the safety command for the projected path and generate subsequent commands using vehicle data from the first controller and the second controller.

2. The prediction system of claim 1 further including instructions to:

compute an additional command by a control model for intersection crossings; and wherein upon determining that the reachable states satisfy the collision criteria further includes instructions to execute the maneuver using a vehicle dynamics controller with the additional command for the projected path.

3. The prediction system of claim 1, wherein the reachable states exclude the predicted reachable states that are unsafe and erroneously identified as safe by the NN model.

4. The prediction system of claim 1, wherein the collision criteria includes one of a distance to road hazards, proximity to longitudinal traffic, and an intersection layout.

5. The prediction system of claim 1, wherein the MPC generates the unverified command for a lane change and the second controller is a safety controller that utilizes a vehicle gap model that generates the safety command for gap-following within traffic.

6. The prediction system of claim 1 further comprising:

switch from the MPC to the second controller by the vehicle for the maneuver upon the collision criteria indicating an object within the reachable states, and the second controller is a safety controller;

wherein the reachable states are further associated with one of the velocity, a jerk, and the steering angle of the vehicle within handling limits for the projected path.

7. The prediction system of claim 1 further including instructions to:

generate, using simulated data for the vehicle, template polyhedra that define coefficients for the NN model, wherein the template polyhedra are fixed with a set of predefined directions for the vehicle; and train the NN model by predicting, iteratively using parallel computations, one of the coefficients for the set of the predefined directions using bounded directions, a control action, and a time interval, wherein the one of the coefficients has a predefined direction and a predefined period.

8. The prediction system of claim 7, wherein the instructions to train the NN model further include instructions to apply a loss function that reduces a likelihood of the NN model estimating that the reachable states that are unsafe erroneously as safe and increases a different likelihood of the NN model estimating the reachable states that are safe and conservative.

9. The prediction system of claim 7, wherein the instructions to train the NN model further include instructions to combine outputs from the parallel computations for the one of the coefficients into a fixed polyhedral associated with a direction and a path image for a plurality of template directions.

10. A non-transitory computer-readable medium comprising:

instructions that when executed by a processor cause the processor to:

generate an unverified command by a first controller and a safety command by a second controller for a projected path by an automated driving system (ADS) associated with a vehicle, and the first controller is a model predictive controller (MPC) that is different than the second controller;

estimate reachable states by a neural network (NN) model that uses the unverified command and an initial condition for the vehicle, the reachable states include a velocity, a steering angle, and a tilt for the vehicle within a bounded time and a state space associated with the initial condition and the projected path, and the reachable states exclude a subset of conservative states having safe maneuvers and exclude predicted reachable states that are unsafe associated with the projected path; and upon determining that the reachable states satisfy collision criteria, execute by the vehicle a maneuver with the safety command for the projected path and generate subsequent commands using vehicle data from the first controller and the second controller.

11. The non-transitory computer-readable medium of claim 10 further including instructions to:

compute an additional command by a control model for intersection crossings; and wherein upon determining that the reachable states satisfy the collision criteria further includes instructions to execute the maneuver using a vehicle dynamics controller with the additional command for the projected path.

12. A method comprising:

generating an unverified command by a first controller and a safety command by a second controller for a projected path by an automated driving system (ADS) associated with a vehicle, and the first controller is a model predictive controller (MPC) that is different than the second controller;

estimating reachable states by a neural network (NN) model that uses the unverified command and an initial condition for the vehicle, the reachable states include a velocity, a steering angle, and a tilt for the vehicle within a bounded time and a state space associated with the initial condition and the projected path, and the reachable states exclude a subset of conservative states having safe maneuvers and exclude predicted reachable states that are unsafe associated with the projected path; and upon determining that the reachable states satisfy collision criteria, executing by the vehicle a maneuver with the safety command for the projected path and generating subsequent commands using vehicle data from the first controller and the second controller.

13. The method of claim 12 further comprising:

computing an additional command by a control model for intersection crossings; and wherein upon determining that the reachable states satisfy the collision criteria further includes executing the maneuver using a vehicle dynamics controller with the additional command for the projected path.

14. The method of claim 12, wherein the reachable states exclude the predicted reachable states that are unsafe and erroneously identified as safe by the NN model.

15. The method of claim 12, wherein the collision criteria includes one of a distance to road hazards, proximity to longitudinal traffic, and an intersection layout.

16. The method of claim 12, wherein the MPC generates the unverified command for a lane change and the second controller is a safety controller that utilizes a vehicle gap model that generates the safety command for gap-following within traffic.

17. The method of claim 12 further comprising:
switching from the MPC to the second controller by the vehicle for the maneuver upon the collision criteria indicating an object within the reachable states, and the second controller is a safety controller;
wherein the reachable states are further associated with one of the velocity, a jerk, and the steering angle of the vehicle within handling limits for the projected path.

18. The method of claim 12 further comprising:
generating, using simulated data for the vehicle, template polyhedra that define coefficients for the NN model, wherein the template polyhedra are fixed with a set of predefined directions for the vehicle; and
training the NN model by predicting, iteratively using parallel computations, one of the coefficients for the set of the predefined directions using bounded directions, a control action, and a time interval, wherein the one of the coefficients has a predefined direction and a predefined period.

19. The method of claim 18, wherein training the NN model further includes applying a loss function that reduces a likelihood of the NN model estimating that the reachable states that are unsafe erroneously as safe and increases a different likelihood of the NN model estimating the reachable states that are safe and conservative.

20. The method of claim 18, wherein training the NN model further includes combining outputs from the parallel computations for the one of the coefficients into a fixed polyhedral associated with a direction and a path image for a plurality of template directions.

* * * * *